US011164363B2

(12) United States Patent
Zhou et al.

(10) Patent No.: US 11,164,363 B2
(45) Date of Patent: Nov. 2, 2021

(54) PROCESSING POINT CLOUDS USING DYNAMIC VOXELIZATION

(71) Applicant: Waymo LLC, Mountain View, CA (US)

(72) Inventors: Yin Zhou, San Jose, CA (US); Pei Sun, Palo Alto, CA (US); Yu Zhang, Santa Clara, CA (US); Dragomir Anguelov, San Francisco, CA (US); Jiyang Gao, San Jose, CA (US); Yu Ouyang, San Jose, CA (US); Zijian Guo, Sunnyvale, CA (US); Jiquan Ngiam, Mountain View, CA (US); Vijay Vasudevan, Los Altos Hills, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/924,080

(22) Filed: Jul. 8, 2020

(65) Prior Publication Data

US 2021/0012555 A1    Jan. 14, 2021

Related U.S. Application Data

(60) Provisional application No. 62/871,676, filed on Jul. 8, 2019.

(51) Int. Cl.
*G06T 15/20*     (2011.01)
*G06K 9/00*      (2006.01)

(52) U.S. Cl.
CPC .......... *G06T 15/20* (2013.01); *G06K 9/00791* (2013.01)

(58) Field of Classification Search
CPC ............................ G06T 15/20; G06K 9/00791
See application file for complete search history.

(56) References Cited

U.S. PATENT DOCUMENTS

| 10,970,518 | B1 * | 4/2021 | Zhou ..................... G06K 9/4628 |
| 2018/0261095 | A1 * | 9/2018 | Qiu ........................ G05D 1/0022 |
| 2019/0147642 | A1 * | 5/2019 | Cole ................... G06K 9/00214 345/419 |
| 2019/0156206 | A1 * | 5/2019 | Graham ............... G06N 3/0454 |
| 2019/0213778 | A1 * | 7/2019 | Du ......................... G06T 17/00 |

OTHER PUBLICATIONS

Chen et al., "Multi-view 3d object detection network for autonomous driving," Proceedings of the IEEE Conference on Computer Vision and Pattern Recognition, 2017, pp. 1907-1915.

(Continued)

*Primary Examiner* — Jitesh Patel
(74) *Attorney, Agent, or Firm* — Fish & Richardson P.C.

(57) ABSTRACT

Methods, systems, and apparatus, including computer programs encoded on computer storage media, for processing point cloud data using dynamic voxelization. When deployed within an on-board system of a vehicle, processing the point cloud data using dynamic voxelization can be used to make autonomous driving decisions for the vehicle with enhanced accuracy, for example by combining representations of point cloud data characterizing a scene from multiple views of the scene.

20 Claims, 4 Drawing Sheets

(56) References Cited

OTHER PUBLICATIONS

Engelcke et al., "Vote3deep: Fast object detection in 3d point clouds using efficient convolutional neural networks," 2017 IEEE International Conference on Robotics and Automation, May 2017, 7 pages.
Geiger et al., "Are we ready for autonomous driving? The kitti vision 398 benchmark suite." 2012 IEEE Conference on Computer Vision and Pattern Recognition, Jun. 2012, pp. 3354-3361.
Girshick et al., "Rich feature hierarchies for accurate object detection and semantic segmentation," Proceedings of the IEEE conference on computer vision and pattern recognition, 2014, 8 pages.
Girshick, "Fast r-cnn," 2015 IEEE International Conference on Computer Vision, Dec. 2015, pp. 1440-1448.
He et al., "Deep residual learning for image recognition," Proceedings of the IEEE Conference on Computer Vision and Pattern Recognition, Jun. 2016, pp. 770-778.
Kingma et al., "Adam: A method for stochastic optimization." CoRR, Dec. 2014, https://arxiv.org/abs/1412.6980, 15 pages.
Ku et al., "Joint 3d proposal generation and object detection from view aggregation," 2018 IEEE/RSJ International Conference on Intelligent Robots and Systems, Oct. 1-5, 2018, 8 pages.
Lang et al., "Pointpillars: Fast encoders for object detection from point clouds," Proceedings of the IEEE/CVF Conference on Computer Vision and Pattern Recognition, 2019, pp. 12697-12705.
Li et al., "3D fully convolutional network for vehicle detection in point cloud," 2017 IEEE/RSJ International Conference on Intelligent Robots and Systems, Sep. 24-28, 2017, pp. 1513-1518.
Li et al., "Vehicle detection from 3d lidar using fully convolutional network," CoRR, Aug. 2016, https://arxiv.org/abs/1608.07916, 8 pages.
Liang et al., "Deep continuous fusion for multi-sensor 3d object detection," Proceedings of the European Conference on Computer Vision, 2018, pp. 641-656.
Liang et al., "Multi-task multi-sensor fusion for 3d object detection," Proceedings of the IEEE/CVF Conference on Computer Vision and Pattern Recognition, 2019, pp. 7345-7353.
Lin et al., "Focal loss for dense object detection," IEEE Transactions on Pattern Analysis and Machine Intelligence, Feb. 2018, 10 pages.
Lin et al., "Microsoft coco: Common objects in context," European conference on computer vision, 2014, 8693:740-755.
Liu et al., "SSD: Single shot multibox detector," European Conference on Computer Vision, 2016, 17 pages.

Meyer et al., "LaserNet: An efficient probabilistic 3D object detector for autonomous driving," Proceedings of the IEEE/CVF Conference on Computer Vision and Pattern Recognition, 2019, pp. 12677-12686.
Qi et al., "Frustum pointnets for 3d object detection from rgb-d data," CoRR, Nov. 2017, https://arxiv.org/abs/1711.08488, 15 pages.
Qi et al., "Pointnet: Deep learning on point sets for 3d classification and segmentation," Proceedings of the IEEE Conference on Computer Vision and Pattern Recognition, 2017, pp. 652-660.
Qi et al., "Pointnet++: Deep hierarchical feature learning on point sets in a metric space," Advances in Neural Information Processing Systems 30, 2017, 10 pages.
Redmon et al., "Yolo9000: Better, faster, stronger," Proceedings of the IEEE Conference on Computer Vision and Pattern Recognition, 2017, 9 pages.
Redmon et al., "You only look once: Unified, real time object detection," Proceedings of the IEEE conference on computer vision and pattern recognition, 2016, pp. 779-788.
Ren et al., "Faster r-cnn: Towards real-time object detection with region proposal networks," Advances in Neural Information Processing Systems 28, 2015, 9 pages.
Shi et al., "Pointrcnn: 3d object proposal generation and detection from point cloud," Proceedings of the IEEE/CVF Conference on Computer Vision and Pattern Recognition, 2019, pp. 770-779.
Simony et al., "Complex-yolo: an euler-region-proposal for real-time 3d object detection on point clouds," Proceedings of the European Conference on Computer Vision Workshops, 2018, 14 pages.
Sindagi et al., "Mvx-net: Multimodal voxelnet for 3d object detection," 2019 International Conference on Robotics and Automation, May 20-24, 2019, 7 pages.
Wang et al., "Voting for voting in online point cloud object detection," Robotics: Science and Systems, Jul. 2015, 3:1-9.
Xu et al., "PointFusion: Deep sensor fusion for 3d bounding box estimation," Proceedings of the IEEE Conference on Computer Vision and Pattern Recognition, 2018, pp. 244-253.
Yan et al., "Second: Sparsely embedded convolutional detection," Sensors, Oct. 2018, 18(10):3337.
Yang et al., "HDNET: Exploiting hd maps for 3d object detection," Proceedings of The 2nd Conference on Robot Learning, 2018, 87:146-155.
Yang et al., "Pixor: Real-time 3d object detection from point clouds," Proceedings of the IEEE Conference on Computer Vision and Pattern Recognition, 2018, pp. 7652-7660.
Zhou et al., "Voxelnet: End-to-end learning for point cloud based 3D object detection," Proceedings of the IEEE Conference on Computer Vision and Pattern Recognition, Jun. 2018, pp. 4490-4499.

\* cited by examiner

PROCESSING POINT CLOUDS USING DYNAMIC VOXELIZATION

CROSS-REFERENCE TO RELATED APPLICATION

This application claims priority to U.S. Provisional Application No. 62/871,676, filed on Jul. 8, 2019. The disclosure of the prior application is considered part of and is incorporated by reference in the disclosure of this application.

BACKGROUND

This specification relates to processing point cloud data using neural networks.

Neural networks are machine learning models that employ one or more layers of nonlinear units to predict an output for a received input. Some neural networks include one or more hidden layers in addition to an output layer. The output of each hidden layer is used as input to or more other layers in the network, i.e., one or more other hidden layers, the output layer, or both. Each layer of the network generates an output from a received input in accordance with current values of a respective set of parameters.

SUMMARY

This specification describes a system implemented as computer programs on one or more computers in one or more locations that processes, using a neural network, point cloud data representing a sensor measurement of a scene captured by one or more sensors to generate a network output that characterizes the scene, e.g., an object detection output that identifies locations of one or more objects in the scene or a different kind of output that characterizes different properties of objects in the scene. For example, the one or more sensors can be sensors of an autonomous vehicle, e.g., a land, air, or sea vehicle, and the scene can be a scene that is in the vicinity of the autonomous vehicle. The network output can then be used to make autonomous driving decisions for the vehicle, to display information to operators or passengers of the vehicle, or both.

The subject matter described in this specification can be implemented in particular embodiments so as to realize one or more of the following advantages. In contrast to existing approaches for processing point cloud data using neural networks, e.g., for object detection, which use hard voxelization, the described techniques use dynamic voxelization to generate a representation of a point cloud that will be processed using a neural network. By making use of dynamic voxelization, the generated representation preserves the complete raw point cloud, yields deterministic voxel features and serves as a natural foundation for fusing information across different views. This allows for the neural network that processes the representation to generate task outputs, e.g., object detection or object classification outputs, that are more accurate and have higher precision that conventional approaches. Additionally, this specification describes a multi-view fusion architecture that can encode point features with more discriminative context information extracted from the different views, e.g., a birds-eye view and a perspective view, resulting in more accurate predictions being generated by the task neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that processes point cloud data representing a sensor measurement of a scene captured by one or more sensors to generate an object detection output that identifies locations of one or more objects in the scene. For example, the one or more sensors can be sensors of an autonomous vehicle, e.g., a land, air, or sea vehicle, and the scene can be a scene that is in the vicinity of the autonomous vehicle. The object detection output can then be used to make autonomous driving decisions for the vehicle, to display information to operators or passengers of the vehicle, or both.

Figure 1:
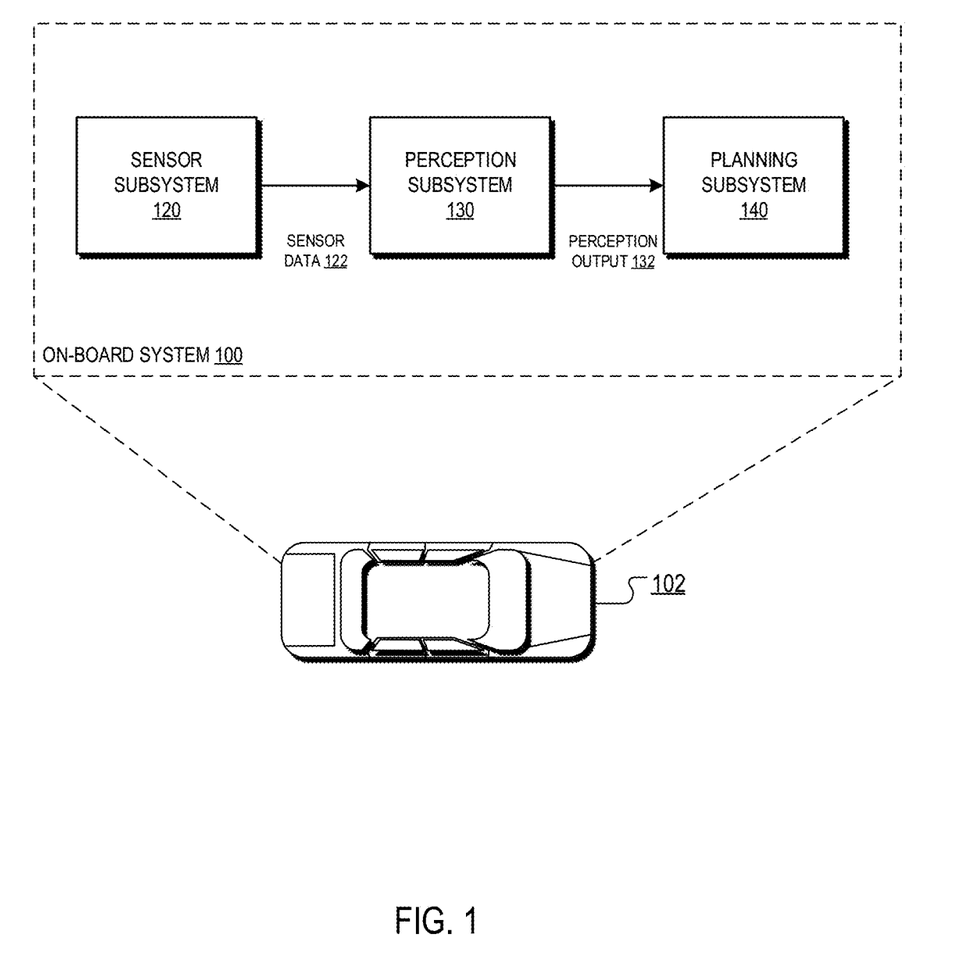
FIG. 1 shows a block diagram of an example on-board system.

FIG. 1 is a block diagram of an example on-board system 100. The on-board system 100 is physically located on-board a vehicle 102. The vehicle 102 in FIG. 1 is illustrated as an automobile, but the on-board system 100 can be located on-board any appropriate vehicle type. The vehicle 102 can be a fully autonomous vehicle that makes fully-autonomous driving decisions or a semi-autonomous vehicle that aids a human operator. For example, the vehicle 102 can autonomously apply the brakes if a full-vehicle prediction indicates that a human driver is about to collide with a detected object, e.g., a pedestrian, a cyclist, another vehicle. While the vehicle 102 is illustrated in FIG. 1 as being an automobile, the vehicle 102 can be any appropriate vehicle that uses sensor data to make fully-autonomous or semi-autonomous operation decisions. For example, the vehicle 102 can be a watercraft or an aircraft. Moreover, the on-board system 100 can include components additional to those depicted in FIG. 1 (e.g., a control subsystem or a user interface subsystem).

The on-board system 100 includes a sensor subsystem 120 which enables the on-board system 100 to "see" the environment in a vicinity of the vehicle 102. The sensor subsystem 120 includes one or more sensors, some of which are configured to receive reflections of electromagnetic radiation from the environment in the vicinity of the vehicle 102. For example, the sensor subsystem 120 can include one or more laser sensors (e.g., LIDAR sensors) that are configured to detect reflections of laser light. As another example, the sensor subsystem 120 can include one or more radar sensors that are configured to detect reflections of radio waves. As another example, the sensor subsystem 120 can include one or more camera sensors that are configured to detect reflections of visible light.

The sensor subsystem 120 repeatedly (i.e., at each of multiple time points) uses raw sensor measurements, data derived from raw sensor measurements, or both to generate sensor data 122. The raw sensor measurements indicate the directions, intensities, and distances travelled by reflected radiation. For example, a sensor in the sensor subsystem 120 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

In particular, the sensor data 122 includes point cloud data that characterizes the latest state of an environment (i.e., an environment at the current time point) in the vicinity of the vehicle 102. A point cloud is a collection of data points defined by a given coordinate system. For example, in a three-dimensional coordinate system, a point cloud can define the shape of some real or synthetic physical system, where each point in the point cloud is defined by three values representing respective coordinates in the coordinate system, e.g., (x, y, z) coordinates. As another example, in a three-dimensional coordinate system, each point in the point cloud can be defined by more than three values, wherein three values represent coordinates in the coordinate system and the additional values each represent a property of the point of the point cloud, e.g., an intensity of the point in the point cloud. Point cloud data can be generated, for example, by using LIDAR sensors or depth camera sensors that are on-board the vehicle 102. For example, each point in the point cloud can correspond to a reflection of laser light or other radiation transmitted in a particular direction by a sensor on-board the vehicle 102.

The on-board system 100 can provide the sensor data 122 generated by the sensor subsystem 120 to a perception subsystem 130 for use in generating perception outputs 132.

The perception subsystem 130 implements components that perform a perception task, e.g., that identify objects within a vicinity of the vehicle or classify already identified objects or both. The components typically include one or more fully-learned machine learning models. A machine learning model is said to be "fully-learned" if the model has been trained to compute a desired prediction when performing a perception task. In other words, a fully-learned model generates a perception output based solely on being trained on training data rather than on human-programmed decisions. For example, the perception output 132 may be a classification output that includes a respective object score corresponding to each of one or more object categories, each object score representing a likelihood that the input sensor data characterizes an object belonging to the corresponding object category. As another example, the perception output 132 can be an object detection output that includes data defining one or more bounding boxes in the sensor data 122, and optionally, for each of the one or more bounding boxes, a respective confidence score that represents a likelihood that an object belonging to an object category from a set of one or more object categories is present in the region of the environment shown in the bounding box. Examples of object categories include pedestrians, cyclists, or other vehicles near the vicinity of the vehicle 102 as it travels on a road.

The on-board system 100 can provide the perception outputs 132 to a planning subsystem 140. When the planning subsystem 140 receives the perception outputs 132, the planning subsystem 140 can use the perception outputs 132 to generate planning decisions which plan the future trajectory of the vehicle 102. The planning decisions generated by the planning subsystem 140 can include, for example: yielding (e.g., to pedestrians identified in the perception outputs 132), stopping (e.g., at a "Stop" sign identified in the perception outputs 132), passing other vehicles identified in the perception outputs 132, adjusting vehicle lane position to accommodate a bicyclist identified in the perception outputs 132, slowing down in a school or construction zone, merging (e.g., onto a highway), and parking. The planning decisions generated by the planning subsystem 140 can be provided to a control system of the vehicle 102. The control system of the vehicle can control some or all of the operations of the vehicle by implementing the planning decisions generated by the planning system. For example, in response to receiving a planning decision to apply the brakes of the vehicle, the control system of the vehicle 102 may transmit an electronic signal to a braking control unit of the vehicle. In response to receiving the electronic signal, the braking control unit can mechanically apply the brakes of the vehicle.

In order for the planning subsystem 140 to generate planning decisions which cause the vehicle 102 to travel along a safe and comfortable trajectory, the on-board system 100 must provide the planning subsystem 140 with high quality perception outputs 132. Some existing approaches to classifying or detecting objects within point cloud data involve generating a representation of the point cloud and then processing the representation using a neural network. However, existing approaches use hard voxelization to generate a representation of the point cloud from a single view of the scene, i.e., a birds-eye view, that assigns some of the points in the point cloud to voxels based on where the points lie from the single view. However, such approaches can result in sub-optimal representations that are not deterministic and that miss information about the scene that may be available from a different view, by considering all of the points in the point cloud, or both.

To alleviate some of these issues, the perception subsystem 130 generates representations of point clouds using dynamic voxelization and in some cases fuses information from multiple views when generating a perception output.

Figure 2:
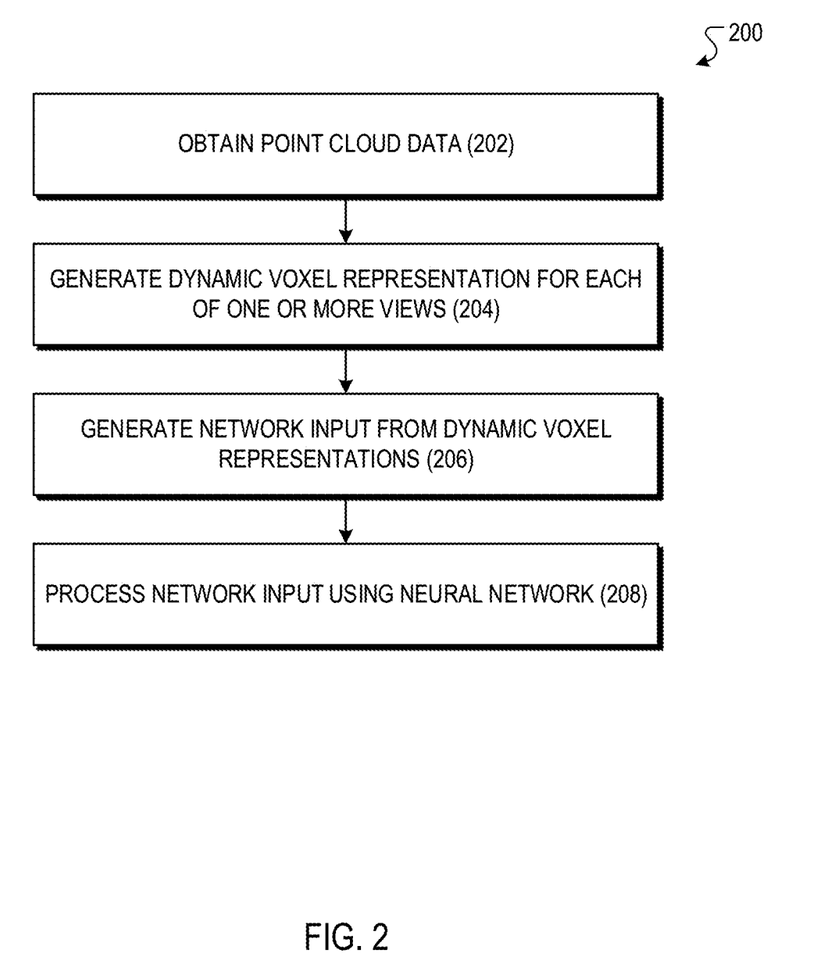
FIG. 2 is a flow diagram of an example process for processing point cloud data.

FIG. 2 is a flow diagram of an example process 200 for processing point cloud data. For convenience, the process 200 will be described as being performed by a system of one or more computers located in one or more locations. For example, an on-board system, e.g., the on-board system 100 of FIG. 1, appropriately programmed in accordance with this specification, can perform the process 200.

The system obtains, i.e., receives or generates, point cloud data representing a sensor measurement of a scene captured by one or more sensors (step 202). The point cloud data includes a feature representation of each of a set of three-dimensional points, i.e., a set of points corresponding to reflections identified by one or more scans of the scene by the one or more sensors. Each three-dimensional point generally has x, y, and z coordinates (or three different coordinates in a different coordinate system). As used in this specification, a feature representation is an ordered collection of numeric values, e.g., a matrix or vector of floating point or quantized values.

For example, the system can receive raw sensor data that identifies the set of three-dimensional points and optionally includes features generated by the one or more sensors for the points, e.g., LiDAR features, and process the raw sensor data for each point using an embedding neural network to generate the feature representations for each of the points.

The system generates, for each of one or more views of the scene, a corresponding dynamic voxel representation that assigns each of the three-dimensional points in the point cloud data to a respective voxel of a variable number of voxels (step 204). In particular, unlike conventional approaches, the dynamic voxel representation does not have a fixed number of voxels or a fixed number of points per voxel. Instead, the dynamic voxel representation has a variable number of voxels, i.e., has different numbers of voxels for different sets of three-dimensional points, and a variable number of points per voxel. Moreover, the dynamic voxel representation defines a bi-directional mapping between voxels and points in the set of three-dimensional points, i.e., all of the points in the point cloud data are included in one of the voxels and no points are discarded.

To generate the dynamic voxel representation for a given view, the system assigns, based on the positions of the three-dimensional points in the point cloud data according to the view, each of the three-dimensional points to a respective one of a set of voxels for the given view. As a particular example, the system can, for a given view, partition the scene into a fixed number of partitions according to the given view and can then assign each point to the voxel the point belongs to according to the given view. Any voxel that at least one point is assigned to is included in the dynamic voxel representation and each point that is assigned to any voxel is also included in the dynamic voxel representation, i.e., no points or voxels are discarded to satisfy fixed size requirements for numbers of voxels or numbers of points per voxel as in conventional techniques. Because different views will partition the scene differently and different views will assign different points to different voxels, the dynamic voxel representation of the same point cloud data for two different views will generally be different.

Generating the dynamic voxel representation is described in more detail below with reference to FIG. 3.

The system then generates a network input from the dynamic voxel representations corresponding to each of the one or more views (step 206).

When there is a single view, e.g., a birds eye view or a perspective view, the system generates the network input by, processing, for each voxel in the dynamic voxel representation, the feature representations of the three-dimensional points assigned to the voxel to generate respective voxel feature representations of each of the three-dimensional points assigned to the voxel. The system then generates the network input from, for each point, at least the voxel feature representation for the point. For example, the network input can include, for each point, a combination, e.g., a concatenation, of the voxel feature representation for the point and the feature representation for the point.

When there are multiple views, e.g., a birds eye view and a perspective view, the system generates the network input by, for any given point, combining data for the point from each of the views. The system is able to perform this combination for all of the points because, as described above, the dynamic voxel representation defines a bi-directional mapping between voxels and points in the set of three-dimensional points. As will be described in more detail below, this allows the system to, for all of the views, separately identify which voxel each point belongs to and to associate voxel-level features with each point from all of the multiple views.

In particular, for a given view, the system processes, for each voxel in the dynamic voxel representation corresponding to the given view, the feature representations of the three-dimensional points assigned to the voxel to generate respective voxel feature representations of each of the three-dimensional points assigned to the voxel.

The system then generates a combined feature representation of the three-dimensional point from at least the voxel feature representations for the three-dimensional point for each of the views. Thus, because of the use of dynamic voxelization, the system is effectively able to combine information from multiple different views of the same scene captured by the same set of one or more sensors.

Generating the network input when there are multiple views is described in more detail below with reference to FIG. 4.

Once the network input is generated, the system processes using a neural network to generate a network output that characterizes the scene (step 208).

The neural network can be any appropriate task neural network that is configured to generate a network output for the desired perception task. Examples of task neural networks are described in more detail below with reference to FIG. 4.

Figure 3:
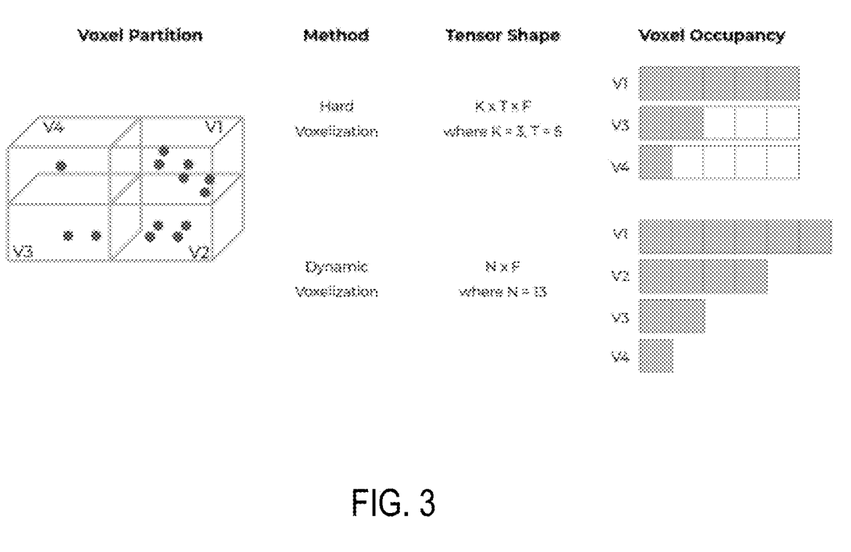
FIG. 3 is an example of generating a dynamic voxel representation for a view of a scene.

FIG. 3 is an example of generating a dynamic voxel representation for a view of a scene.

In particular, FIG. 3 shows the generation of a dynamic voxel representation for a view of the scene generated using dynamic voxelization and a conventional voxel representation of the view of the scene generated using hard voxelization.

In general, the system assigns, based on positions of the three-dimensional points in the point cloud data according to the view, each of the three-dimensional points to a respective one of the voxels of the set of voxels.

As shown in FIG. 3, a point cloud that includes thirteen points is partitioned into four voxels V1, V2, V3, and V4, with six points being assigned to V1, four points being assigned to V2, two points being assigned to V3, and one point being assigned to V4. Each point is also associated with features of dimension F. The voxels V1, V2, V3, and V4 are determined by partitioning the scene into a fixed number of partitions according to the particular view of the scene and the points are assigned to the voxels by assigning each point to the voxel the point belongs to according to the given view.

That is, when the view is a birds-eye view, the voxels are generated by partitioning the scene into a fixed number of partitions in a Cartesian coordinate space and then assigning the three-dimensional points to voxels based on positions of the three-dimensional points in the Cartesian coordinate space.

When the view is a perspective view, the voxels are generated by partitioning the scene into a fixed number of partitions in a spherical coordinate space and then assigning the three-dimensional points to voxels based on positions of the three-dimensional points in the spherical coordinate space. A voxel in perspective view may also be referred to as a three-dimensional frustum.

Because of the different coordinate systems used by the different views, the partitioning and the assignment will generally be different between different the different views, resulting in at least some of the points being grouped with different sets of other points for different views.

In hard voxelization, after voxel partitioning, the representation is generated by assigning the points to a buffer of fixed size K×T×F, where K is the maximum number of voxels that can be represented, T is the maximum number of points per voxel, and F is the feature dimension of each point in the representation. In the example of FIG. 2, K=3 and T=5. Because the dimensions K and T are fixed, the resulting representation is always the same size. However, since a voxel may be assigned more points than its fixed point capacity T allows, in hard voxelization a system subsamples a fixed T number of points from each voxel. Similarly, if the point cloud produces more voxels than the fixed voxel capacity K, the voxels are sub-sampled to yield K total voxels. On the other hand, when there are fewer points in a given voxel or fewer total voxels than the fixed capacity T or V allows, the unused entries in the representation are zero-padded. Thus, hard voxelization (HV) has three intrinsic limitations: (1) As points and voxels are dropped when they exceed the buffer capacity, HV forces the model that processes the representation to throw away information that may be useful for detection; (2) This stochastic dropout of points and voxels may also lead to non-deterministic voxel embeddings, and consequently unstable or jittery detection outcomes; (3) Voxels that are padded cost unnecessary computation, which hinders the run-time performance.

As can be seen from the "voxel occupancy" in FIG. 1, hard voxelization results in a representation that has three voxels, V1, V3, and V4, with V1 having the maximum five entries, V3 having two entries, and V4 having one entry. The remaining three entries for V3 and four entries in V4 are zero padded.

Thus, hard voxelization drops one point in V1 and misses V2 entirely, while still requiring 15F memory usage for the representation.

Dynamic voxelization can mitigate these limitations.

In particular, to generate the dynamic voxel representation for a given view, the system assigns, based on the positions of the three-dimensional points in the point cloud data according to the view, each of the three-dimensional points to a respective one of a set of voxels for the given view. As a particular example, the system can, for a given view, partition the scene into a fixed number of partitions according to the given view and can then assign each point to the voxel the point belongs to according to the given view.

Any voxel that at least one point is assigned to is included in the dynamic voxel representation and each point that is assigned to any voxel is also included in the dynamic voxel representation, i.e., no points or voxels are discarded to satisfy fixed size requirements for numbers of voxels or numbers of points per voxel as in conventional techniques. Because different views will partition the scene differently and different views will assign different points to different voxels, the dynamic voxel representation of the same point cloud data for two different views will generally be different.

In the example of FIG. 3, the system generates a representation that includes six entries for V1, four entries for V2, two entries for V3, and one entry for V4, with no voxels or points being dropped and no zero padding employed. This results in a memory usage of 13F. Thus, dynamic voxelization captures all thirteen points with lower memory usage than hard voxelization.

Figure 4:
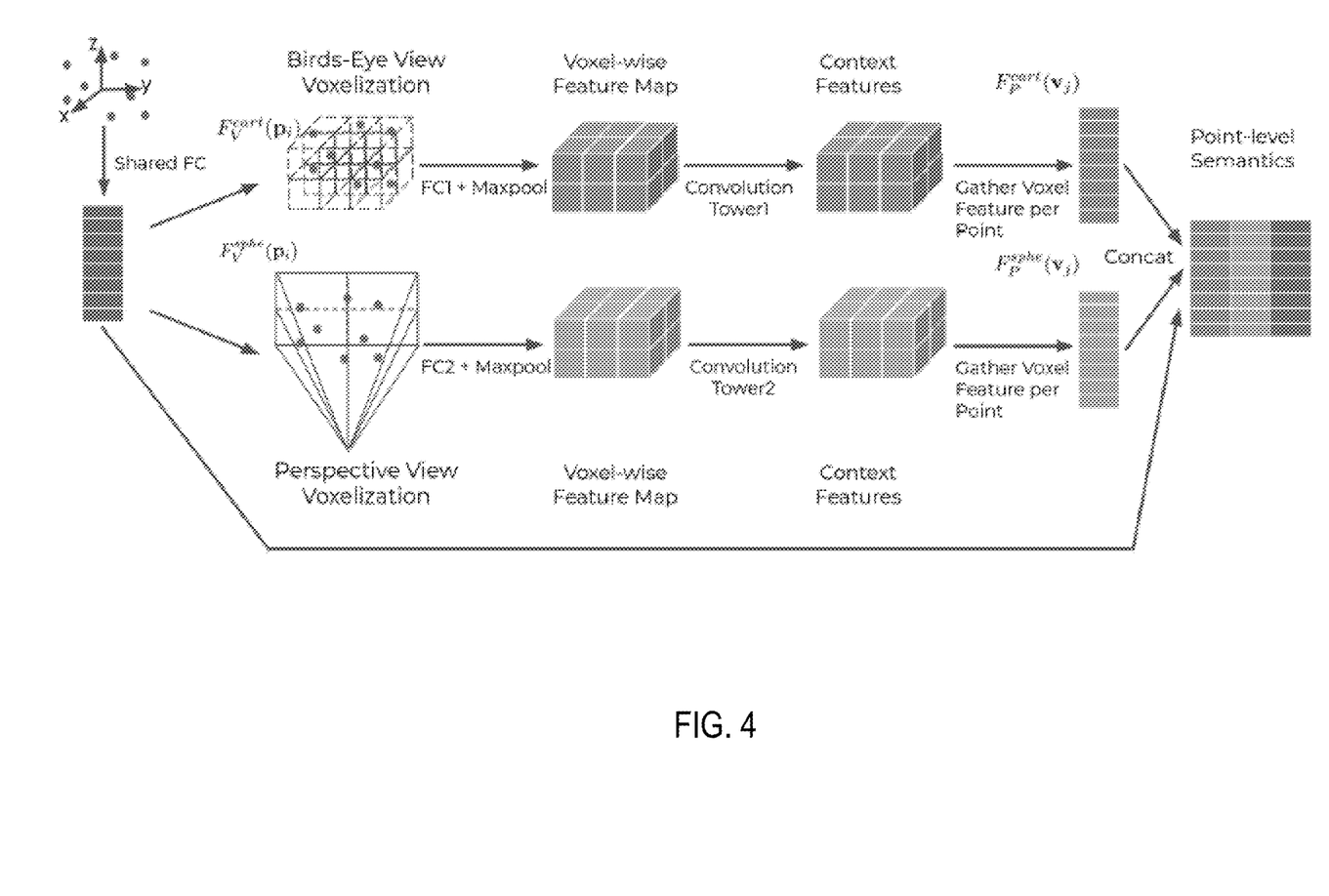
FIG. 4 shows an example process for applying multi-view fusion to generate a network input.

FIG. 4 shows an example process for applying multi-view fusion to generate a network input from a raw input point cloud when there are multiple views. In the example of FIG. 4, there are two views: bird's eye view and perspective view.

In particular, the raw input point cloud includes raw sensor data for each of multiple three-dimensional points and the system first processes the raw sensor data using an embedding neural network ("shared FC") to generate point cloud data that includes a respective feature representation for each of the three-dimensional points.

For example, the raw sensor data can include, for each point, the point intensity as measured by the sensor that captured the sensor data and the three-dimensional coordinates of the point. In this example, the system can process, for each point, the point intensity and the respective local coordinates of the point in the voxel to which the point was assigned in each of the multiple views using the embedding neural network to generate the feature representation of the point.

The embedding neural network can be, for example, a fully-connected (FC) neural network. As a particular example, the embedding neural network can be composed of a linear layer, a batch normalization (BN) layer and a rectified linear unit (ReLU) layer.

The system then generates, for each of the views, a corresponding dynamic voxel representation that assigns, to each voxel of a set of voxels for the view, a variable number of three-dimensional points as described above. As a result, the system also establishes, for each view, a bi-directional mapping between voxels in the dynamic voxel representation and the three-dimensional points in the point cloud data. The established point/voxel mappings are ($F^{cart}v(p)$, $F^{cart}_P(v_j)$) and ($F_{sphe}v(p_i)$, $F_{spheP}(V_j)$) for the birds-eye view and the perspective view, respectively.

Within each view and for each voxel in the dynamic voxel representation corresponding to the view, the system processes the feature representations of the three-dimensional points assigned to the voxel to generate respective voxel feature representations of each of the three-dimensional points assigned to the voxel. In other words, the system generates a respective voxel feature representation for each voxel and then associates the voxel feature representation with each point assigned to the voxel using the established mapping.

In particular, within each view and to generate the voxel feature representations for the voxels corresponding to the view, the system processes the feature representation for each point using an additional neural network ("FC2") to generate view-dependent features for the point. The additional neural network can also be a fully-connected (FC) neural network. As a particular example, the additional neural network can be composed of a linear layer, a batch normalization (BN) layer and a rectified linear unit (ReLU) layer.

Then, by referencing the point to voxel mapping, the system aggregates voxel-level information from the points within each voxel for the view by applying pooling, e.g., max pooling ("maxpool") or average pooling, to generate a voxel-wise feature map for the view. By performing this aggregation, the system can effectively generate the voxel feature representations even when different voxels have different numbers of points.

In other words, within each view, the system separately generates view-dependent features for each point and then aggregates the view-dependent features to generate voxel-level features for each voxel in the representation for the view.

As a particular example, the voxel-wise feature map can include a respective spatial location corresponding to each of the partitions of the scene in the corresponding view. For each partition that corresponds to a voxel, i.e., each partition to which at least one point was assigned during voxelization, the features at the spatial location corresponding to the partition are the voxel-level features for the corresponding voxel. For any partition that does not correspond to a voxel, i.e., any partition to which no points were assigned during voxelization, the features at the spatial location corresponding to the partition are placeholder features, i.e., features set to zeroes or another default value.

The system can then process the voxel-level feature map for the view using a convolutional neural network ("convolution tower") to generate the voxel feature representations ("context features") for each of the voxels in the view.

Finally, with each view and using the point-to-voxel mapping, the system gathers voxel features per point ("gather voxel feature per point"). In other words, for each point, the system associates the voxel feature representation for the voxel to which the point belongs with the point.

By performing these operations for each view, the system generates, for each point, respective voxel feature representations for each of the views.

The system then generates a combined feature representation of the three-dimensional point from at least the voxel feature representations for the three-dimensional point for each of the views. In particular, the system combines, e.g., concatenates, at least the voxel feature representations for the three-dimensional point for each of the views to generate the combined feature representation ("point-level semantics"). In the particular example of FIG. 4, the system concatenates ("concat") the voxel feature representations for the three-dimensional point for each of the views and the feature representation generated by the embedding neural network to generate the combined feature representation for a given point.

The system can then generate the network input by combining the combined feature representations of the three-dimensional points. For example, the system can scatter or otherwise generate a pseudo-image (an h×w×d feature map) from the combined feature representations of the three-dimensional points.

This network input, i.e., the pseudo-image, can then be processed by a task neural network, e.g., a conventional two-dimensional convolutional neural network that has been configured to perform the desired task, to generate a network output for the desired task. In some implementations, the system transforms the combined feature representation to a lower feature dimension, e.g., using a learned projection matrix, as part of generating the network input to reduce computational cost.

For example, when the task is object detection, the task neural network can include a two-dimensional convolutional backbone neural network and a 3d object detection neural network head that is configured to process the output of the backbone neural network to generate an object detection output that identifies locations of objects in the point cloud, e.g., that identifies locations of bounding boxes in the image and a likelihood that each bounding box includes an object.

An example of a convolutional neural network backbone and an object detection head is described in A. H. Lang, S. Vora, H. Caesar, L. Zhou, J. Yang, and O. Beijbom. Pointpillars: Fast encoders for object detection from point clouds. CVPR, 2019. However, the task neural network can generally have any appropriate architecture that maps a network input to an output for the desired task.

The system can train each of the neural network components described with reference to FIG. 4 jointly with the task neural network on ground truth object detection outputs for point clouds in a set of training data. For example, when the task is object detection, the loss function used for the training of these neural networks can be an object detection loss that measures the quality of object detection outputs generated by the these neural networks relative to the ground truth object detection outputs, e.g., smoothed losses for regressed values and cross entropy losses for classification outputs. Particular of examples of loss functions that can be used for the training are described in Y. Yan, Y. Mao, and B. Li. Second: Sparsely embedded convolutional detection. Sensors, 18 (10):3337, 2018 and A. H. Lang, S. Vora, H. Caesar, L. Zhou, J. Yang, and O. Beijbom. Pointpillars: Fast encoders for object detection from point clouds. CVPR, 2019.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   obtaining point cloud data representing a sensor measurement of a scene captured by a sensor, the point cloud data comprising a respective feature representation for each of a plurality of three-dimensional points in the scene;
   generating, for each of one or more views of the scene, a corresponding dynamic voxel representation that assigns, to each voxel of a set of voxels for the view, a variable number of three-dimensional points, wherein each three-dimensional point in the point cloud data is assigned to a respective one of the voxels of the set of voxels in the corresponding dynamic voxel representation, and wherein the generating comprises:
      assigning, based on positions of the three-dimensional points in the point cloud data according to the view, each of the three-dimensional points to a respective one of the voxels of the set of voxels;
   generating a network input from the dynamic voxel representations corresponding to each of the one or more views; and
   processing the network input generated from the dynamic voxel representations corresponding to each of the one or more views using a neural network to generate a network output that characterizes the scene.

2. The method of claim 1, wherein obtaining the point cloud data comprises:
   obtaining raw sensor data for each of the three-dimensional points; and
   processing the raw sensor data using an embedding neural network to generate the point cloud data.

3. The method of claim 1, wherein the neural network is an object detection neural network and the network output is an object detection output that identifies objects that are located in the scene.

4. The method of claim 1, wherein the sensor is a LiDAR sensor.

5. The method of claim 1, wherein a first view of the one or more views is a birds-eye view, and
   wherein assigning each of the three-dimensional points to a respective one of the of voxels in the dynamic voxel representation corresponding to the birds-eye view comprises assigning the three-dimensional points to voxels based on positions of the three-dimensional points in a Cartesian coordinate space.

6. The method of claim 1, wherein a second view of the one or more views is a perspective view, and
   wherein assigning each of the three-dimensional points to a respective one of the voxels in the dynamic voxel representation corresponding to the perspective view comprises assigning the three-dimensional points to voxels based on positions of the three-dimensional points in a spherical coordinate space.

7. The method of claim 1, wherein generating the network input comprises, for each of the one or more views:
   for each voxel in the dynamic voxel representation corresponding to the view, processing the feature representations of the three-dimensional points assigned to the voxel to generate respective voxel feature representations of each of the three-dimensional points assigned to the voxel.

8. The method of claim 7, wherein the one or more views comprise a plurality of views and wherein generating the network input comprises, for each of the three-dimensional points in the point cloud data:
   generating a combined feature representation of the three-dimensional point from at least the voxel feature representations for the three-dimensional point for each of the views; and
   generating the network input by combining the combined feature representations of the three-dimensional points.

9. The method of claim 8, wherein generating the combined feature representation of the three-dimensional point comprises concatenating the voxel feature representations for the three-dimensional point for each of the views and the feature representation for the three-dimensional point in the point cloud data.

10. The method of claim 1, wherein, for each of the one or more views, the dynamic voxel representation corresponding to the view defines a bi-directional mapping between voxels in the dynamic voxel representation and the three-dimensional points in the point cloud data.

11. A system comprising one or more computers and one or more storage devices storing instructions that when executed by the one or more computers cause the one or more computers to perform operations comprising:
   obtaining point cloud data representing a sensor measurement of a scene captured by a sensor, the point cloud data comprising a respective feature representation for each of a plurality of three-dimensional points in the scene;
   generating, for each of one or more views of the scene, a corresponding dynamic voxel representation that assigns, to each voxel of a set of voxels for the view, a variable number of three-dimensional points, wherein each three-dimensional point in the point cloud data is assigned to a respective one of the voxels of the set of voxels in the corresponding dynamic voxel representation, and wherein the generating comprises:
      assigning, based on positions of the three-dimensional points in the point cloud data according to the view, each of the three-dimensional points to a respective one of the voxels of the set of voxels;
   generating a network input from the dynamic voxel representations corresponding to each of the one or more views; and
   processing the network input generated from the dynamic voxel representations corresponding to each of the one or more views using a neural network to generate a network output that characterizes the scene.

12. The system of claim 11, wherein obtaining the point cloud data comprises:
   obtaining raw sensor data for each of the three-dimensional points; and processing the raw sensor data using an embedding neural network to generate the point cloud data.

13. The system of claim 11, wherein the neural network is an object detection neural network and the network output is an object detection output that identifies objects that are located in the scene.

14. The system of claim 11, wherein a first view of the one or more views is a birds-eye view, and
wherein assigning each of the three-dimensional points to a respective one of the of voxels in the dynamic voxel representation corresponding to the birds-eye view comprises assigning the three-dimensional points to voxels based on positions of the three-dimensional points in a Cartesian coordinate space.

15. The system of claim 11, wherein a second view of the one or more views is a perspective view, and
wherein assigning each of the three-dimensional points to a respective one of the voxels in the dynamic voxel representation corresponding to the perspective view comprises assigning the three-dimensional points to voxels based on positions of the three-dimensional points in a spherical coordinate space.

16. The system of claim 11, wherein generating the network input comprises, for each of the one or more views:
for each voxel in the dynamic voxel representation corresponding to the view, processing the feature representations of the three-dimensional points assigned to the voxel to generate respective voxel feature representations of each of the three-dimensional points assigned to the voxel.

17. The system of claim 16, wherein the one or more views comprise a plurality of views and wherein generating the network input comprises, for each of the three-dimensional points in the point cloud data:
generating a combined feature representation of the three-dimensional point from at least the voxel feature representations for the three-dimensional point for each of the views; and
generating the network input by combining the combined feature representations of the three-dimensional points.

18. The system of claim 17, wherein generating the combined feature representation of the three-dimensional point comprises concatenating the voxel feature representations for the three-dimensional point for each of the views and the feature representation for the three-dimensional point in the point cloud data.

19. The system of claim 11, wherein, for each of the one or more views, the dynamic voxel representation corresponding to the view defines a bi-directional mapping between voxels in the dynamic voxel representation and the three-dimensional points in the point cloud data.

20. One or more non-transitory computer-readable media storing instructions that when executed by one or more computers cause the one or more computers to perform operations comprising:
obtaining point cloud data representing a sensor measurement of a scene captured by a sensor, the point cloud data comprising a respective feature representation for each of a plurality of three-dimensional points in the scene;
generating, for each of one or more views of the scene, a corresponding dynamic voxel representation that assigns, to each voxel of a set of voxels for the view, a variable number of three-dimensional points, wherein each three-dimensional point in the point cloud data is assigned to a respective one of the voxels of the set of voxels in the corresponding dynamic voxel representation, and wherein the generating comprises:
assigning, based on positions of the three-dimensional points in the point cloud data according to the view, each of the three-dimensional points to a respective one of the voxels of the set of voxels;
generating a network input from the dynamic voxel representations corresponding to each of the one or more views; and
processing the network input generated from the dynamic voxel representations corresponding to each of the one or more views using a neural network to generate a network output that characterizes the scene.

* * * * *